United States Patent
Takeda (10) Patent No.: US 7,167,695 B2
(45) Date of Patent: Jan. 23, 2007

(54) DIVERSITY RECEIVER AND METHOD OF DIVERSITY RECEPTION

(75) Inventor: Masahiro Takeda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 212 days.

(21) Appl. No.: 10/486,392

(22) PCT Filed: May 2, 2003

(86) PCT No.: PCT/JP03/05625

§ 371 (c)(1),
(2), (4) Date: Feb. 11, 2004

(87) PCT Pub. No.: WO03/098838

PCT Pub. Date: Nov. 27, 2003

(65) Prior Publication Data

US 2004/0242173 A1 Dec. 2, 2004

(30) Foreign Application Priority Data

May 20, 2002 (JP) .............................. 2002-144873

(51) Int. Cl.
*H04B 7/08* (2006.01)
*H04B 7/00* (2006.01)

(52) U.S. Cl. .................... 455/132; 455/277.1; 455/273

(58) Field of Classification Search ................ 455/130, 455/133, 140, 143, 276.1, 273, 277.1, 277.2, 455/132, 275; 375/136, 144, 147, 148; 342/380, 342/383, 378
See application file for complete search history.

(56) References Cited

U.S. PATENT DOCUMENTS 5,335,359 A * 8/1994 Tsujimoto et al. .......... 455/506

(Continued)

FOREIGN PATENT DOCUMENTS

JP 10-93323 A 4/1998

(Continued)

OTHER PUBLICATIONS

Miura et al, "Self-Beam Steering Array Antenna by Digital Beamforming for Mobile Satelite Communications" IEICE Trans., B-II vol. J-79-B-II No. 8, 1996, pp. 448-458, no month listed.

(Continued)

*Primary Examiner*—Sonny Trinh
(74) *Attorney, Agent, or Firm*—Birch, Stewart, Kolasch and Birch, LLP (57) ABSTRACT

The diversity receiver according to the present invention operates as a multicarrier diversity receiver. The diversity receiver includes weight calculators that calculate a weight coefficient for each carrier based on information about a phase difference between branches and amplitude information on each carrier obtained from a reception frame, and branch combiners that combine reception signals at branches for each carrier based on the weight coefficient prior to signal detection.

8 Claims, 9 Drawing Sheets

U.S. PATENT DOCUMENTS

| | | | |
|---|---|---|---|
| 5,598,428 A * | 1/1997 | Sato | 375/148 |
| 5,692,018 A * | 11/1997 | Okamoto | 375/347 |
| 5,697,083 A * | 12/1997 | Sano | 455/276.1 |
| 5,757,866 A * | 5/1998 | Kannari et al. | 375/347 |
| 5,982,825 A * | 11/1999 | Tsujimoto | 375/347 |
| 6,069,912 A * | 5/2000 | Sawahashi et al. | 375/142 |
| 6,087,986 A * | 7/2000 | Shoki et al. | 342/383 |
| 6,137,824 A * | 10/2000 | Liu | 375/130 |
| 6,947,715 B1 * | 9/2005 | Kolze | 455/132 |
| 2002/0187814 A1 * | 12/2002 | Yoshida | 455/562 |
| 2004/0042532 A1 * | 3/2004 | Artamo et al. | 375/148 |
| 2004/0229581 A1 * | 11/2004 | Mizoguchi et al. | 455/136 |

FOREIGN PATENT DOCUMENTS

JP  2001-156689 A  6/2001

OTHER PUBLICATIONS

Adachi et al, "BER Performance of QDPSK with Postdection Diversity Reception in Mobile Radio Channels." IEEE Transactions on Vehicular Technology, vol. 40 No. 1, 1991, pp. 237-249, no month listed.

* cited by examiner

DIVERSITY RECEIVER AND METHOD OF DIVERSITY RECEPTION

TECHNICAL FIELD

The present invention relates to a multicarrier diversity receiver and a method of multicarrier diversity reception, and more particularly, to a diversity receiver and a method of diversity reception for a digital radio communication apparatus used in digital mobile communications, digital satellite communications, and digital mobile satellite communications, etc.

BACKGROUND ART

In digital mobile communications, a conventional diversity receiver suffers from a fading that occurs as a phenomenon of an intensive variation in amplitude and phase of a reception signal, due to reflection, diffraction, or scattering of a signal wave from a geological formation or ground features around a mobile station. One of the techniques to improve performances of a signal reception in the fading environment is a diversity reception technique that receives signals at a plurality of branches, and combines the signals or selects a signal. An example of the conventional configuration is a differential detection diversity receiver that detects differentially coded single-carrier quadrature-phase-shift-keying (QPSK) signals, and then combines to carry out a diversity receiving of signals.

Figure 8:
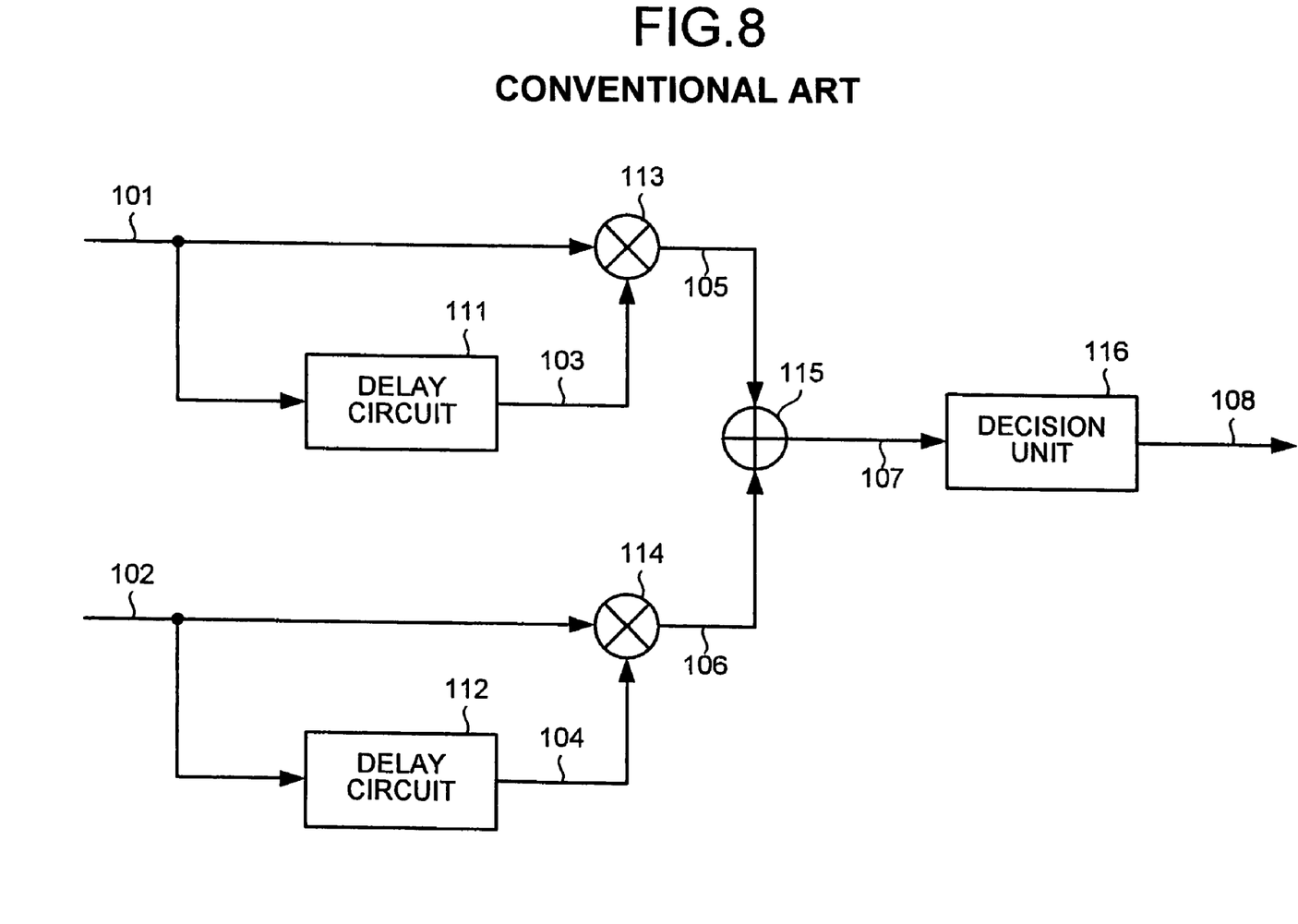
FIG. 8 is a schematic diagram of an example of a conventional diversity receiver.

FIG. 8 is a schematic diagram of the conventional differential detection diversity receiver described in "F. Adachi and K. Ohno, "BER Performance of QDPSK with Post-detection Diversity Reception in Mobile Radio Channels, IEEE Transactions on Vehicular Technology, volume 40, No. 1 (1991), pp. 237–249"

101 and 102 denote reception signals, and 103 and 104 denote reception signals before one symbol. 105 and 106 denote reception signals after complex weight multiplication. 107 denotes a signal after diversity combining, and 108 denotes a result of a decision about the reception signal. 111 and 112 denote delay circuits that delay an input signal at each branch by time of one symbol. 113 and 114 denote complex multipliers that multiply a reception signal by a complex weight at each branch. 115 denotes a complex adder that combines receptions signals that are multiplied by a complex weight at each branch, and 116 denotes a signal decision unit.

When the reception signal 101 at a specific branch is input, the delay circuit 111 delays the signal by a time corresponding to one symbol, and outputs the reception signal 103 before one symbol. The complex multiplier 113 complex multiplies the reception signal 101 by the reception signal 103 before one symbol, and outputs the reception signal after the complex weight multiplication (i.e., a result of a differential detection) 105.

On the other hand, when the reception signal 102 at a different branch is input, the delay circuit 112 delays the signal by a time corresponding to one symbol, and outputs the reception signal 104 before one symbol. The complex multiplier 114 complex multiplies the reception signal 102 by the reception signal 104 before one symbol, and outputs the reception signal after the complex weight multiplication (i.e., a result of a differential detection) 106.

The complex adder 115 complex adds the results of the differential detection at both branches, and outputs soft decision data as the signal 107 after the diversity combining. The decision unit 116 carries out a hard decision about the soft decision data, and outputs hard decision data 108 as a result of the decision about the reception signal.

As explained above, the differential detection diversity receiver that carries out a combined diversity reception after detection combines the results of the differential detection at each branch, compares the result with a result of carrying out no diversity reception, and improves the performances.

As a reception system for multicarrier transmission, there is a system of diversity combining reception signals at each branch before detection. A configuration and operation of the diversity receiver before detection for multicarrier modulation is explained, as a second conventional technology.

Figure 9:
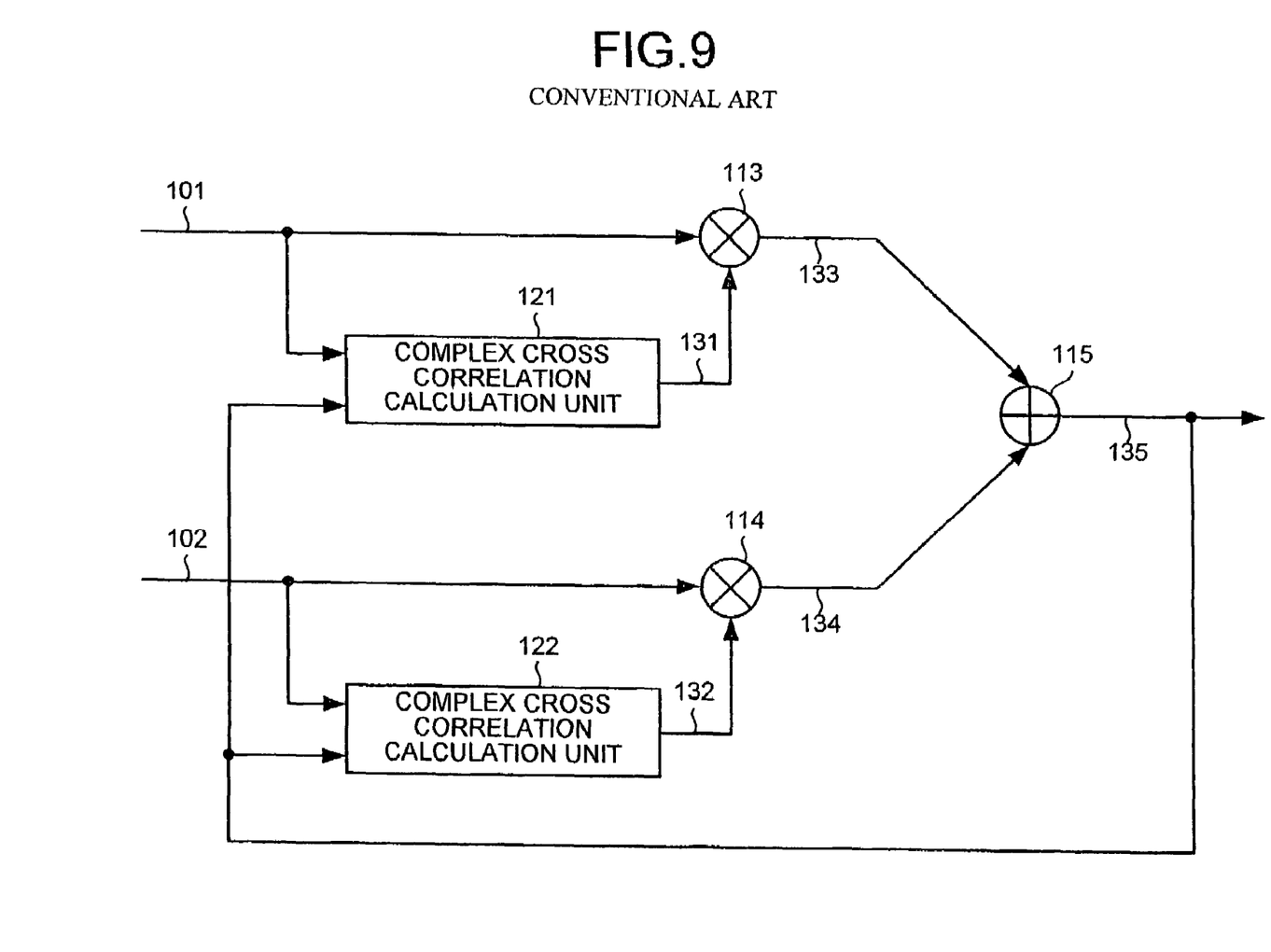
FIG. 9 is a schematic diagram of another example of the conventional diversity receiver.

FIG. 9 is a schematic diagram of the conventional diversity receiver before detection for multicarrier modulation that is disclosed in Japanese Patent Application Laid-open Publication No. 2001-156689. 131 and 132 denote complex weights. 133 and 134 denote reception signals after complex weight multiplication. 135 denotes a signal after diversity combining. 121 and 122 denote complex cross correlation calculation units that calculate complex cross correlation respectively.

First, signals (101, 102) received by antennas are sent to the complex cross correlation calculation units (121, 122) and complex multipliers (113, 114) respectively. The complex cross correlation calculation units (121, 122) calculate complex weights (131, 132), and output results of the calculation to the complex multipliers (113, 114) respectively.

The complex multipliers (113, 114) process the reception signals (101, 102) as complex signals, and output to the complex multiplier 115 the reception signals (133, 134) as the results of multiplication between the reception signals (101, 102) and the complex weights (131, 132). A complex multiplier 115 sums both signals, and outputs the diversity-combined result as a signal 135 to the complex cross correlation calculation units (121, 122) and a subsequent detector (not shown) respectively.

The complex cross correlation calculation units (121, 122) set a reception signal as a sum of a direct wave Di and a delayed wave Ui, that is, Di+Ui. The complex cross correlation calculation units (121, 122) set a feedback signal as a sum of a sum Do of the advance waves and a sum Uo of the delayed waves, that is, Do+Uo. As a result, a complex weight Wi can be expressed as Eq. (1) by taking a correlation between the received signal and the feedback signal.

$$Wi = \int (DiDo^* + UiUo^*)dt + \int (DiUo^* + UiDo^*)dt \quad (1)$$

In Eq. (1), as the correlation is small, a second integration of the right hand side can be considered to take an extremely small value in probability. Therefore, when Do of the sum Do+Uo is large, Eq. (2) is obtained, and when Uo is large, on the contrary, Eq. (3) is obtained.

$$Wi = \int DiDo^* dt \quad (2)$$

$$Wi = \int UiUo^* dt \quad (3)$$

With the above arrangement, the diversity combining is carried out such that the direct wave becomes strong when the direct wave is strong as a total, and the delayed wave becomes strong when the delayed wave is strong as a total by a feedback mechanism.

However, according to the conventional diversity receiver, when the diversity combining after detection is applied to the multicarrier transmission, the wave detection is carried out after extracting a plurality of carriers at each branch, and the combining processing is carried out. Therefore, the number of times of carrying out the carrier extraction and the wave detection increases. In other words, when the number of branches increases to carry out the diversity, the receiver executes a larger amount of processing.

There is still another problem that, when the diversity combining before detection for multicarrier modulation is carried out, a maximum ratio combining cannot be executed, as the propagation path characteristics are different depending on transmission stations when a mobile station transmits a signal to a base station in the mobile communications.

Therefore, it is an object of the present invention to provide a diversity receiver and a method of diversity reception capable of decreasing the processing amount and achieving optimum demodulation performances by diversity.

DISCLOSURE OF THE INVENTION

It is an object of the present invention to solve at least the problems in the conventional technology.

The diversity receiver for multicarrier signals according to one aspect of the present invention includes a weight coefficient calculation unit that calculates a weight coefficient for each carrier based on information on a phase difference between branches and information on amplitude of each carrier obtained from a reception frame and a combining unit that combines reception signals at each of the branches for each carrier based on the weight coefficient prior to signal detection.

The method of diversity reception for multicarrier signals according to another aspect of the present invention includes calculating a weight coefficient for each carrier based on information on a phase difference between branches and information on amplitude of each carrier obtained from a reception frame and combining reception signals at each of the branches for each carrier based on the weight coefficient prior to signal detection.

The other objects, features and advantages of the present invention are specifically set forth in or wilt become apparent from the following detailed descriptions of the invention when read in conjunction with the accompanying drawings.

BEST MODE FOR CARRYING OUT THE INVENTION

Exemplary embodiments of a diversity receivers and a method of diversity reception according to the present invention will be explained in detail with reference to the accompanying drawings. It should be noted that the present invention is not limited by these embodiments.

Figure 1:
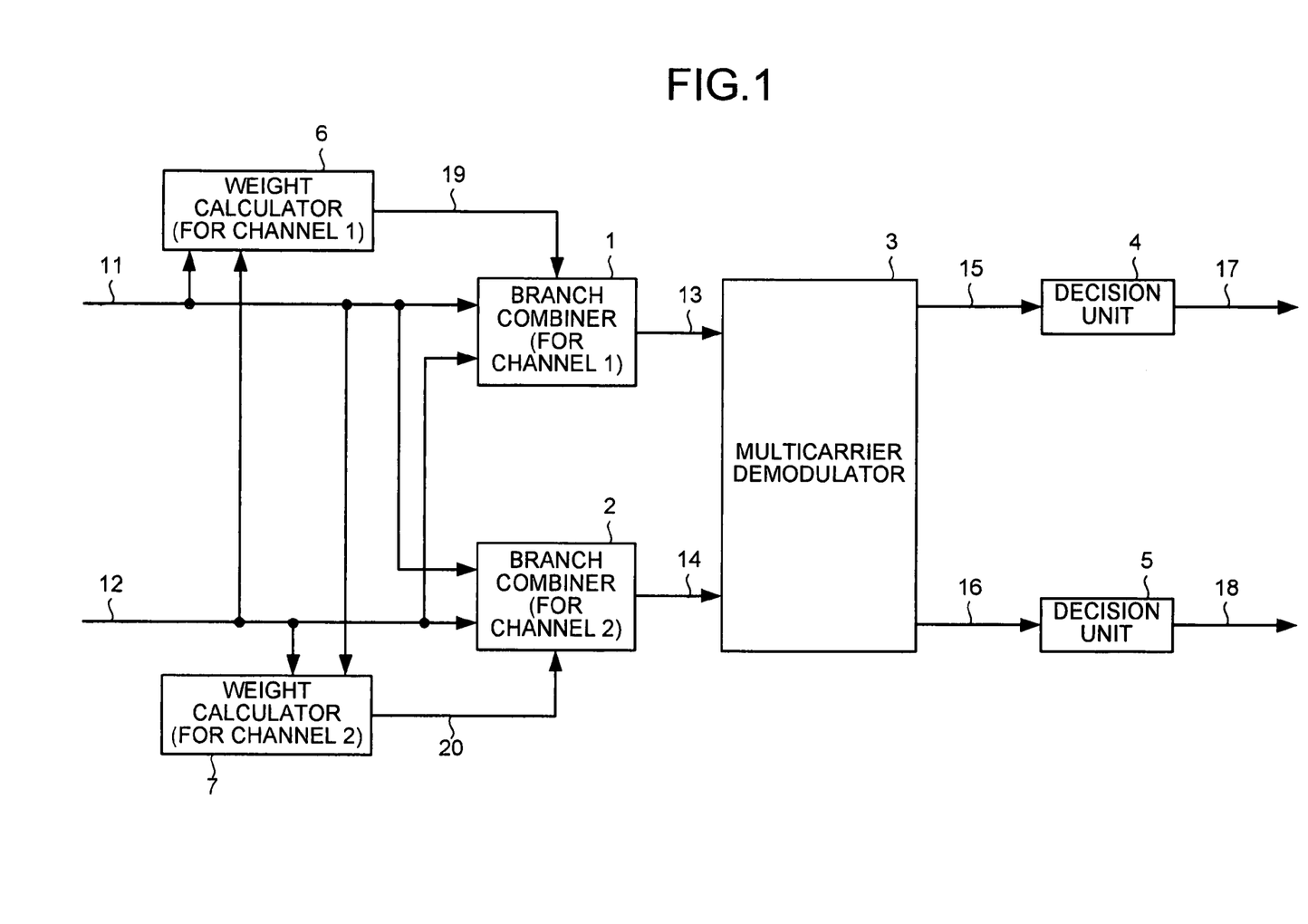
FIG. 1 is a schematic diagram of a diversity receiver according to a first embodiment of the present invention.

FIG. 1 is a schematic diagram of a diversity receiver according to the first embodiment. In the present embodiment, reception of two carrier signals at two branches is assumed. The diversity receiver includes branch combiners 1 and 2 for each carrier, a multicarrier demodulator 3, decision units 4 and 5, weight calculators 6 and 7 that calculate weight coefficients used to combine reception signals, reception signals 11 and 12, branch combination outputs, 13 and 14, carrier detection results 15 and 16, results of decision 17 and 18 about the reception signals, and weight coefficients 19 and 20 that are used to combine the reception signals.

Figure 2:
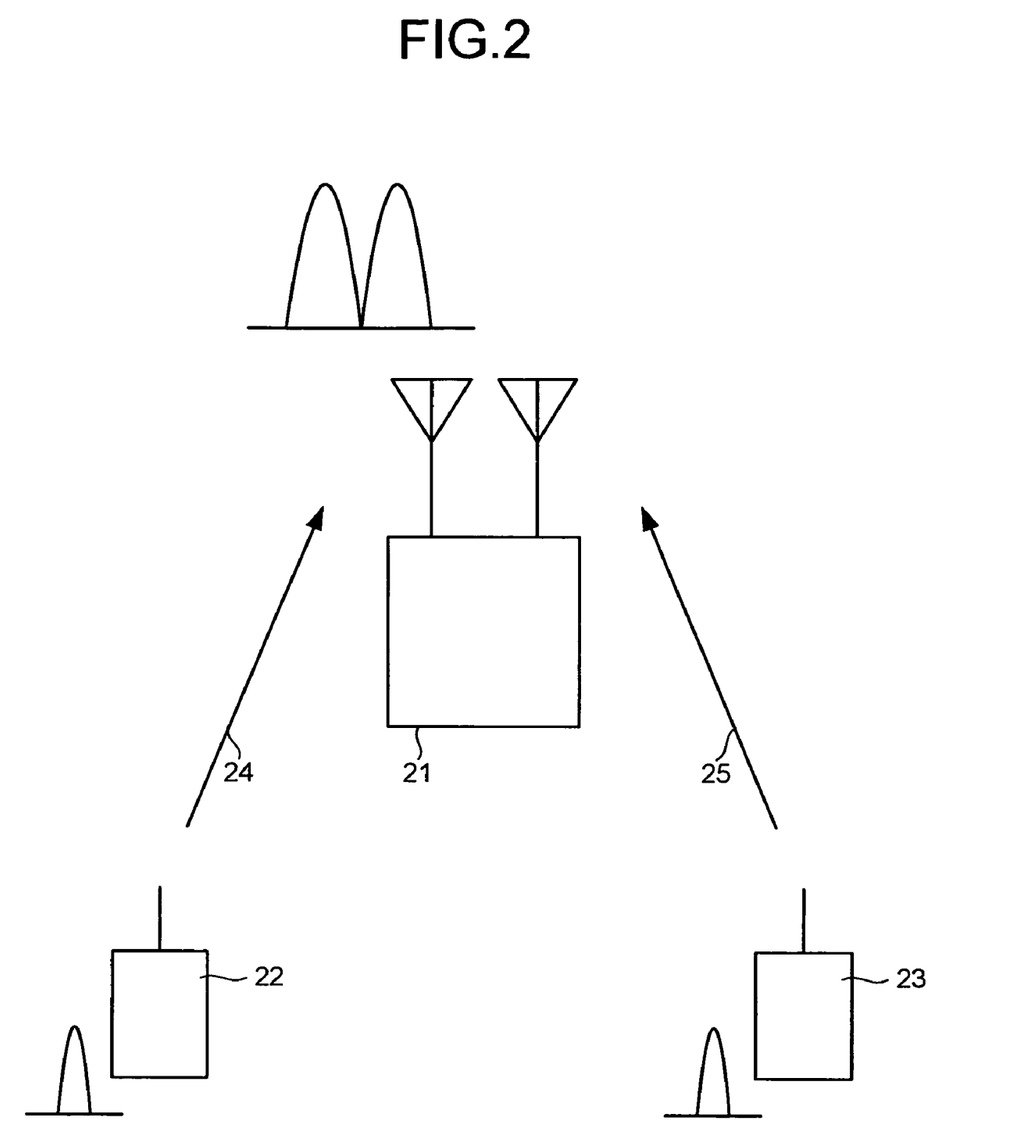
FIG. 2 is an illustration of a transmission line model that is assumed in the first embodiment.

FIG. 2 is an illustration of a transmission line model that is assumed in the first embodiment. 21 denotes a base station that receives a multicarrier signal, 22 and 23 denote mobile stations. 24 and 25 denote transmission signals from the mobile stations 22 and 23 to the base station 21 respectively.

First, the weight calculators 6 and 7 calculate the weight coefficients 19 and 20 that are optimum during the branch combining using the reception signal at the branch combiner 1 and the reception signal at the branch combiner 2. The mobile station 22 and the mobile station 23 use different transmission lines to the base station 21. Therefore, the weight coefficient 19 for a channel 1 and the weight coefficient 20 for a channel 2 are different. Accordingly, the weight coefficient 19 for the channel 1 and the weight coefficient 20 for the channel 2 are calculated separately.

Figure 3:
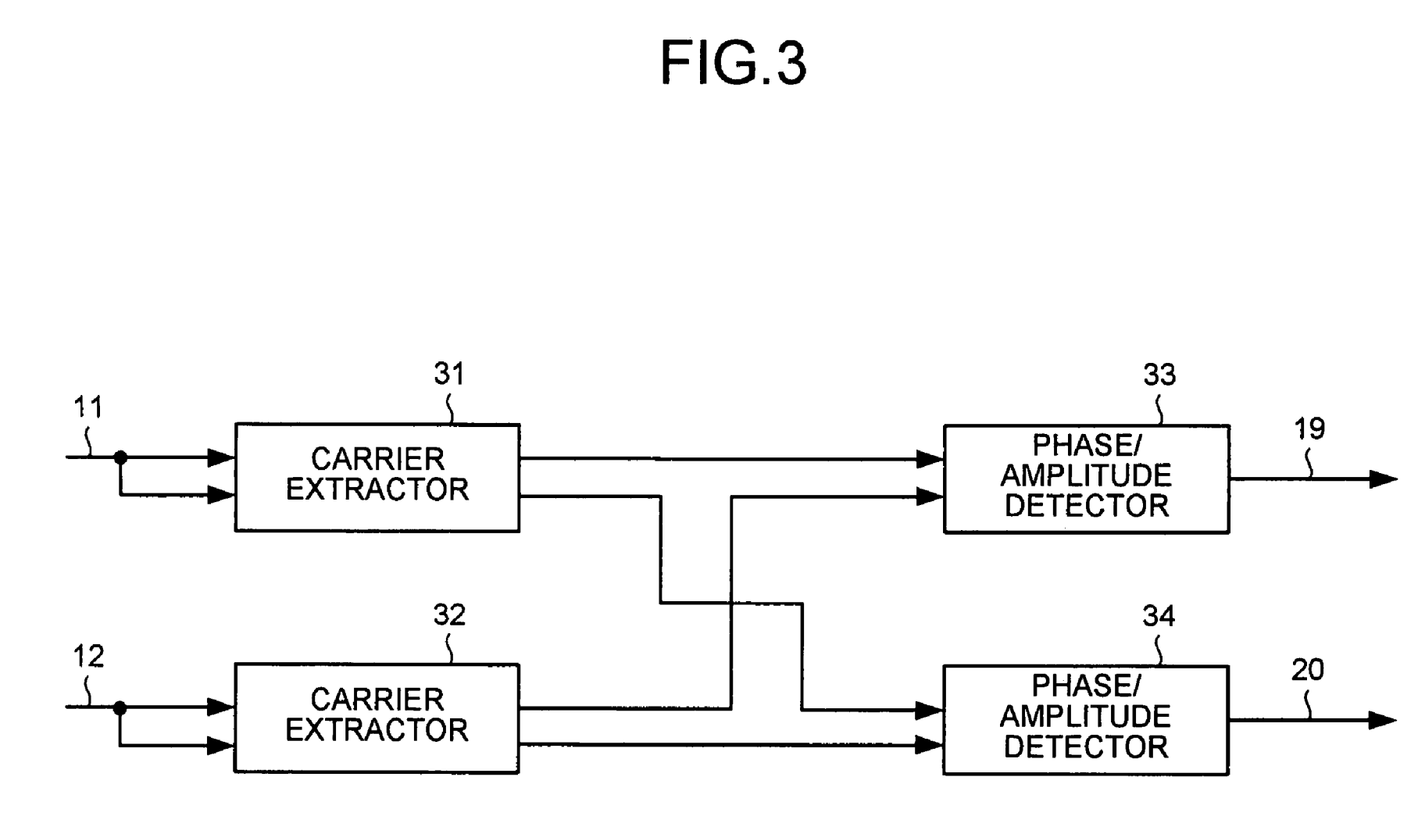
FIG. 3 is a schematic diagram of an example of a weight calculator.

FIG. 3 is a schematic diagram of an example of the weight calculators 6 and 7. 31 and 32 denote carrier extractors, and 33 and 34 denote phase/amplitude detectors. In this case, only a part of a transmission frame, for example, only a training signal (a known reference signal) portion, is demodulated. Information about a phase difference and amplitude between branches concerning the carriers (the channel 1 and the channel 2) is obtained. Weight coefficients to in-phase combine the reception signals at the two branches are calculated based on the information obtained.

The branch combiners 1 and 2 carry out branch combining using the weight coefficients for the carriers (the channel 1 and the channel 2) and the reception signals at the branches.

Figure 4:
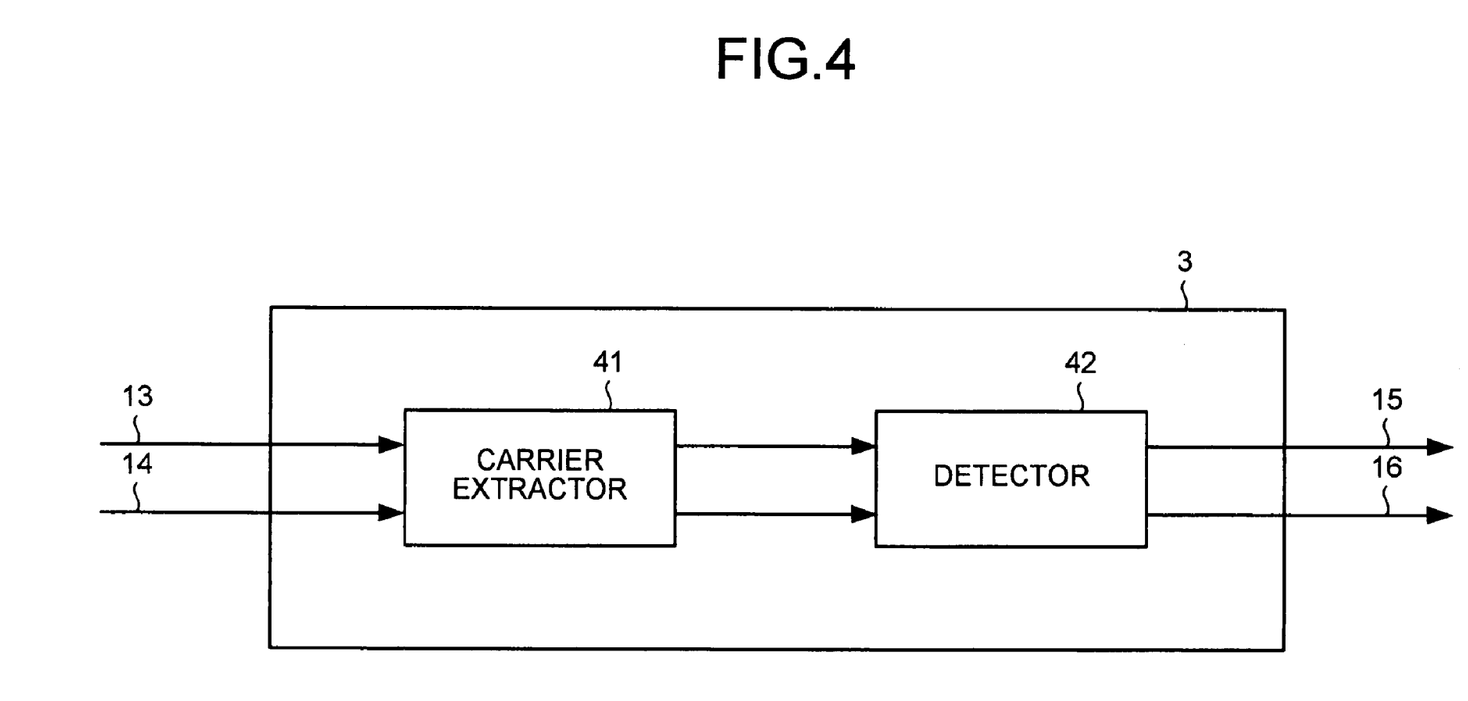
FIG. 4 is a schematic diagram of an example of a multicarrier demodulator.

The multicarrier demodulator 3 carries out the detection processing using the branch combination outputs 13 and 14. FIG. 4 is a schematic diagram of an example of the multicarrier demodulator 3. 41 denotes a carrier extractor, and 42 denotes a detector. In the multicarrier demodulator 3, the carrier extractor 41 extracts carriers to be demodulated from the branch combination results (i.e., multicarrier signals). The detector 42 detects the extracted carriers. The carrier extractor 41 uses an extraction method, for example, of complex multiplexing an internal local frequency, shifting a desired carrier to the frequency of a baseband, and extracting the carrier with a low pass filter (LPF). The detector 42 uses a detection method, for example, of using a coherent detection or a delayed detection when the signals are coded differentially.

The decision units 4 and 5 make a hard decision for the carrier detection results 15 and 16, and output hard decision data as the results 17 and 18 of the decision about the reception signals.

As explained above, in the present embodiment, signals at the branches are combined before decoding the multicarrier. With this arrangement, the processing amount for the demodulation can be reduced (to one over the number of branches) as compared with the system of combining after the detection. When the carriers arrive via different propagation paths, for example, the weight coefficients can be calculated for these carriers. Therefore, optimum demodulation performances by diversity can be obtained.

In the present embodiment, the diversity receiver that receives the multicarrier signals of two carriers from two branches is explained. However, when a diversity receiver that receives multicarrier signals of an optional plurality of carriers is used, an effect similar to that of the above system can also be obtained using a plurality of weight calculators and combiners. A diversity receiver that receives multicarrier signals from a plurality of branches can also obtain an effect similar to that of the above system using weight calculators corresponding to these branches and combiners that combine the branches.

Figure 5:
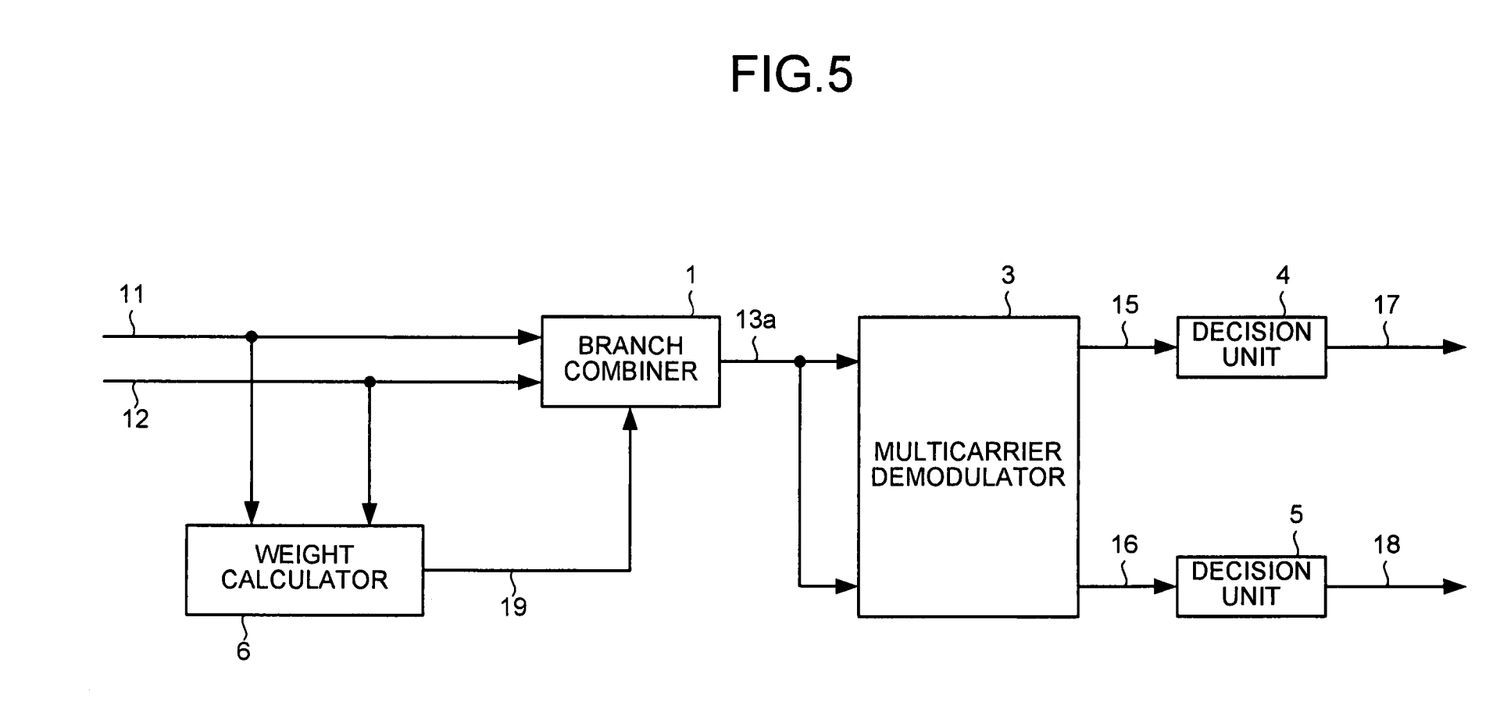
FIG. 5 is a schematic diagram of a diversity receiver according to a second embodiment of the present invention.

FIG. 5 is a schematic diagram of a diversity receiver according to the second embodiment. In the present embodiment, it is also assumed that two carrier signals are received from two branches. 13*a* denotes a branch combination output. Configurations similar to those in the first embodiment are assigned with like reference numerals, and their explanation will be omitted.

Figure 6:
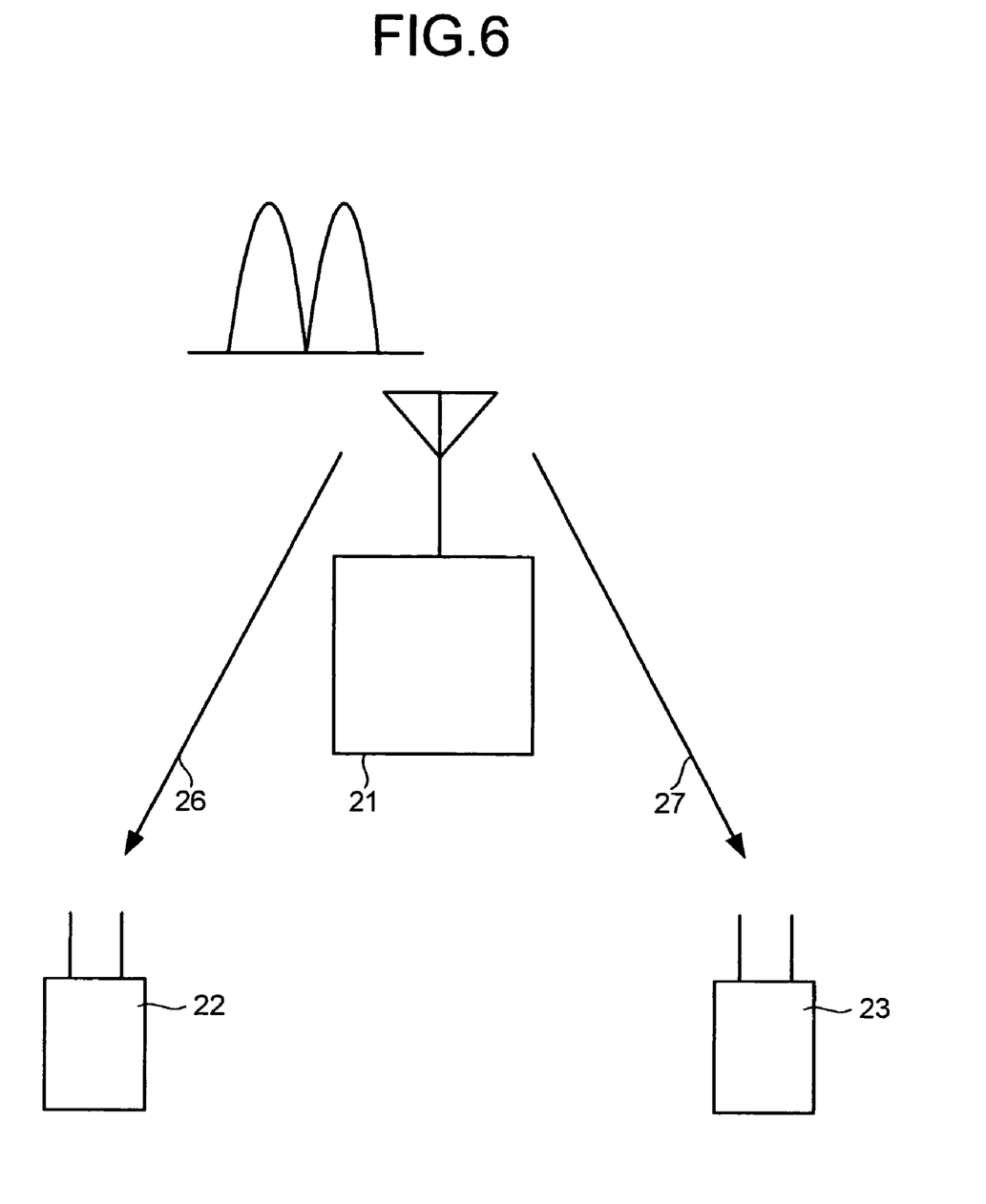
FIG. 6 is an illustration of a transmission line model that is assumed in the second embodiment.

FIG. 6 is an illustration of a transmission line model that is assumed in the second embodiment. 26 and 27 denote transmission signals from the base station 21 to the mobile stations 22 and 23. In the present embodiment, a "down link in the multicarrier transmission" that has substantially the same transmission line performances in the carriers and that can be regarded to have no frequency selective fading is assumed.

The weight calculator 6 calculates the weight coefficient 19 that is optimum during the branch combining using the reception signal at the branch combiner 1 and the reception signal at the branch combiner 2. In this case, as the transmission line performance of the carriers can be regarded substantially the same, a plurality of carrier signals can be combined at the same time. The branch combiner 1 branch-combines using the weight coefficient 19, the reception signal 11, and the reception signal 12, and outputs the branch combination output 13*a*.

The multicarrier demodulator 3 carries out the detection processing for each carrier using the branch combination output 13*a*.

As explained above, in the present embodiment, even when the number of branches increases, the same multicarrier demodulator can detect carriers when the number of the carriers received does not change. As a result, it is possible to prevent the processing amount of the demodulator from increasing following the increase in the number of branches.

Figure 7:
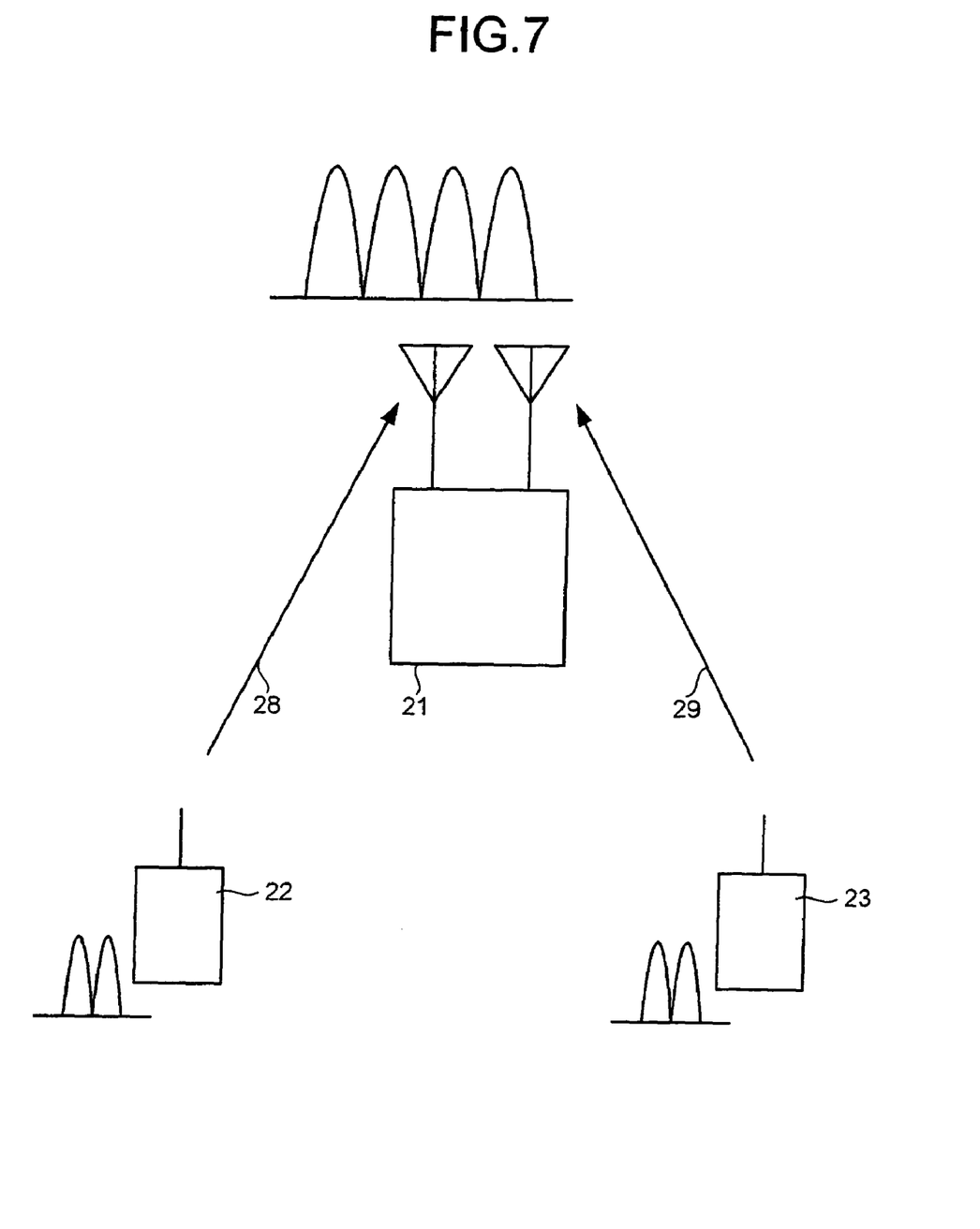
FIG. 7 is an illustration of a transmission line model that is assumed in a third embodiment of the present invention.

FIG. 7 is an illustration of a transmission line model that is assumed in the third embodiment. 28 and 29 denote transmission signals from the mobile stations 22 and 23 to the base station 21. In the present embodiment, it is assumed that a plurality of carriers that are received has substantially the same transmission line performances, and that the carriers are divided into groups. As one example, when the two mobile stations 22 and 23 transmit two carrier signals respectively, the transmission signals from these mobile stations reach the base station in substantially the same transmission line performances. In this case, the multicarrier signals transmitted from the same mobile station can be diversity-combined at the same time.

The weight calculator according to the present embodiment sets the carriers having the same transmission line performances into one group, and calculates an optimum weight coefficient for each group using the reception signal at each branch. Then, branch combining is carried out at one time for each group using the weight coefficients and the reception signals at the branches in a similar manner to that of the second embodiment.

As explained above, according to the present embodiment, signals of the same transmission line performance are set into the same group, and the weight coefficient for the branch combining is calculated for each group. Therefore, optimum demodulation performances by diversity can be obtained.

In the present embodiment, the diversity receiver that combines multicarrier signals of four carriers by dividing the signals into two groups is explained. A diversity receiver that receives multicarrier signals of an optional plurality of carriers can also obtain an effect similar to the effect of the above system by using weight calculators corresponding to the number of groups and a combiner. Even when the number of carriers of the multicarrier signals received from the mobile station changes, an effect similar to the above effect can also be obtained when the transmission line performances of the carriers can be regarded the same.

As explained above, according to one aspect of the present invention, signals at the branches are combined before decoding the multicarrier. With this arrangement, there, is an effect that the diversity receiver that can reduce the processing amount for the demodulation can be obtained as compared with the system of combining after the detection. When the carriers arrive via different propagation paths, for example, the weight coefficients can be calculated for these carriers. Therefore, there is an effect that the diversity receiver that can obtain the optimum demodulation performances by diversity can be obtained.

According to another aspect of the present invention, even when the number of branches increases, the same multicarrier demodulator can detect carriers when the number of the carriers received does not change. Therefore, there is an effect that it is possible to obtain the diversity receiver that can prevent the processing amount of the demodulator from increasing following the increase in the number of branches.

According to still another aspect of the present invention, signals of the same transmission line performances are set into the same group, and the weight coefficient for the branch combining is calculated for each group. Therefore, there is an effect that the diversity receiver that can obtain optimum demodulation performances by diversity can be obtained.

According to still another aspect of the present invention, signals at the branches are combined before decoding the multicarrier. With this arrangement, there is an effect that the processing amount for the demodulation can be reduced as compared with the system of combining after the detection. When the carriers arrive via different propagation paths, for example, the weight coefficients can be calculated for these carriers. Therefore, there is an effect that optimum demodulation performances by diversity can be obtained.

According to still another aspect of the present invention, even when the number of branches increases, the same multicarrier demodulator can detect carriers when the number of the carriers received does not change. Therefore, there is an effect that it is possible to prevent the processing amount of the demodulator from increasing following the increase in the number of branches.

According to still another aspect of the present invention, signals of the same transmission line performances are set into the same group, and the weight coefficient for the branch combining is calculated for each group. Therefore, there is an effect that optimum demodulation performances by diversity can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

INDUSTRIAL APPLICABILITY

The multicarrier diversity receiver and the method of multicarrier diversity reception according to the present invention are effective for a digital radio communication apparatus for digital mobile communications, digital satellite communications, digital mobile satellite communications, etc. Particularly, the multicarrier diversity receiver and the method of multicarrier diversity reception are suitable for a receiver having a possibility of being used in the fading environment.

The invention claimed is:

1. A diversity receiver for multicarrier signals comprising:
   a weight coefficient calculation unit that calculates a weight coefficient for each carrier based on information on a phase difference between branches and information on amplitude of each carrier obtained from a reception frame; and
   a combining unit that combines reception signals at each of the branches for each carrier based on the weight coefficient prior to signal detection.

2. The diversity receiver according to claim 1, wherein when all carriers have same propagation path characteristics,
   the weight coefficient calculation unit calculates the weight coefficient common to all the carriers, and
   the combining unit collectively combines all the carriers based on the weight coefficient common to all the carriers prior to the signal detection.

3. The diversity receiver according to claim 1, wherein when each of arbitrary groups of carriers has same propagation path characteristics,
   the weight coefficient calculation unit divides a plurality of carriers having the same propagation path characteristics into one group, and calculates the weight coefficient common to each group, and
   the combining unit combines reception signals at each of the branches for each group based on the weight coefficient common to all the carriers prior to the signal detection.

4. The diversity receiver according to claim 2, wherein when each of arbitrary groups of carriers has same propagation path characteristics,
   the weight coefficient calculation unit divides a plurality of carriers having the same propagation path characteristics into one group, and calculates the weight coefficient common to each group, and
   the combining unit combines reception signals at each of the branches for each group based on the weight coefficient common to all the carriers prior to the signal detection.

5. A method of diversity reception for multicarrier signals comprising:
   calculating a weight coefficient for each carrier based on information on a phase difference between branches and information on amplitude of each carrier obtained from a reception frame; and
   combining reception signals at each of the branches for each carrier based on the weight coefficient prior to signal detection.

6. The method according to claim 5, wherein when all carriers have same propagation path characteristics, the method includes
   calculating the weight coefficient common to all the carriers, and
   combining collectively all the carriers based on the weight coefficient common to all the carriers prior to the signal detection.

7. The method according to claim 5, wherein when each of arbitrary groups of carriers has same propagation path characteristics, the method includes
   dividing a plurality of carriers having the same propagation path characteristics into one group,
   calculating the weight coefficient common to each group, and
   combining reception signals at each of the branches for each group based on the weight coefficient common to all the carriers prior to the signal detection.

8. The method according to claim 6, wherein when each of arbitrary groups of carriers has same propagation path characteristics, the method includes
   dividing a plurality of carriers having the same propagation path characteristics into one group,
   calculating the weight coefficient common to each group, and
   combining reception signals at each of the branches for each group based on the weight coefficient common to all the carriers prior to the signal detection.

* * * * *